US012654172B2

(12) United States Patent
Merikoski et al.

(10) Patent No.: US 12,654,172 B2
(45) Date of Patent: Jun. 16, 2026

(54) FRETTING WEAR REDUCTION OF INTERFERENCE FITTED CONE CRUSHER HEAD

(71) Applicant: METSO FINLAND OY, Espoo (FI)

(72) Inventors: Mikko Merikoski, Tampere (FI); Petri Kujansuu, Tampere (FI)

(73) Assignee: Metso Finland Oy, Espoo (FI)

( * ) Notice: Subject to any disclaimer, the term of this patent is extended or adjusted under 35 U.S.C. 154(b) by 285 days.

(21) Appl. No.: 18/570,464

(22) PCT Filed: Jun. 6, 2022

(86) PCT No.: PCT/FI2022/050387
§ 371 (c)(1),
(2) Date: Dec. 14, 2023

(87) PCT Pub. No.: WO2023/275433
PCT Pub. Date: Jan. 5, 2023

(65) Prior Publication Data

US 2024/0269681 A1 Aug. 15, 2024

(30) Foreign Application Priority Data

Jun. 28, 2021 (FI) ..................................... 20215759

(51) Int. Cl.
*B02C 2/04* (2006.01)

(52) U.S. Cl.
CPC ............ *B02C 2/04* (2013.01); *B02C 2210/02* (2013.01)

(58) Field of Classification Search
CPC ........................................................ B02C 2/04
See application file for complete search history.

(56) References Cited

U.S. PATENT DOCUMENTS 3,550,870 A * 12/1970 Kaljunov .................. B02C 2/04 241/215
4,034,922 A 7/1977 Coxhill
(Continued)

FOREIGN PATENT DOCUMENTS

CN 2351195 Y 12/1999
CN 201124101 Y 10/2008
(Continued)

OTHER PUBLICATIONS

International Search Report and Written Opinion for PCT/FI2022/050387, mailed Oct. 25, 2022.
(Continued)

*Primary Examiner* — Matthew Katcoff
(74) *Attorney, Agent, or Firm* — Andrus Intellectual Property Law, LLP

(57) ABSTRACT

A cone crusher head, system, and crusher including the cone crusher head and system. A conical mantle radially extends from an interference fit section and has a head diameter $D_{ch}$. The conical mantle has a wear part support surface and a shaft support surface. The interference fit section has a nominal interference fit diameter $D_{if}$. The conical mantle has an armpit groove for receiving a slip ring. The armpit groove is covered by the conical mantle with an armpit thickness $L_a$. Fretting wear is reduced by dimensioning the crusher head so that a ratio of the head diameter $D_{ch}$ to the nominal interference fit diameter $D_{if}$ is most 2.5; and a ratio of the head diameter $D_{ch}$ to the armpit thickness $L_a$ is at least 10.5.

20 Claims, 3 Drawing Sheets

(56) References Cited

U.S. PATENT DOCUMENTS

| | | | | |
|---|---|---|---|---|
| 10,722,895 | B2 * | 7/2020 | McCloskey | B02C 2/042 |
| 10,814,328 | B2 * | 10/2020 | Kuvaja | F16J 15/3268 |
| 12,337,330 | B2 * | 6/2025 | Eriksson | F16C 17/12 |
| 2002/0170995 | A1 | 11/2002 | Jean | |
| 2003/0183706 | A1 * | 10/2003 | Cheng | B02C 2/04 241/46.06 |
| 2017/0304830 | A1 | 10/2017 | Polinski | |
| 2019/0099760 | A1 | 4/2019 | O'Bryan | |

FOREIGN PATENT DOCUMENTS

| | | | |
|---|---|---|---|
| CN | 102355953 | A | 2/2012 |
| CN | 204365374 | U | 6/2015 |
| CN | 109070091 | A | 12/2018 |
| CN | 212791112 | U | 3/2021 |
| EP | 3778969 | A1 | 2/2021 |
| WO | 2017181234 | A1 | 10/2017 |
| WO | 2020069719 | A1 | 4/2020 |
| WO | 2020119878 | A1 | 6/2020 |

OTHER PUBLICATIONS

Search Report for Finnish Patent Application No. 20215759, dated Jan. 1, 2022.

Office action and search report for Chinese Patent Application No. 202280044820.3, published Nov. 18, 2025.

Notification of Granting of Patent of Chinese Patent Application No. 2022800448203, issued Apr. 29, 2026.

* cited by examiner

210

FRETTING WEAR REDUCTION OF INTERFERENCE FITTED CONE CRUSHER HEAD

CROSS-REFERENCE TO RELATED APPLICATIONS

This application is the U.S. national stage application of International Application PCT/FI2022/050387, filed Jun. 6, 2022, which international application was published on Jan. 5, 2023, as International Publication WO 2023/275433 Al in the English language. The International Application claims priority of Finnish Patent Application No. 20215759 filed Jun. 28, 2021.

TECHNICAL FIELD

The present disclosure generally relates to fretting wear reduction in an interference fit of a cone crusher head.

BACKGROUND

This section illustrates useful background information without admission of any technique described herein representative of the state of the art.

In a cone crusher, a crusher head is supported and driven by a main shaft so as to produce crushing forces in a crushing chamber that is defined by outer and inner wear parts. The crusher head is typically either integrally formed or attached to the main shaft by cone fit or interference fit. In the latter, the crusher head or support cone defines a hole of given height and of a diameter that sufficiently expands on heating so that the crusher head can be placed onto the main shaft. On cooling to same temperature with the main shaft, the interference fit keeps the crusher head firmly in place. Interference fit is also used to attach train wheels on their shafts.

Unlike train wheels, the interference fit of a cone crusher head is exposed to very complex dynamic force variation. The cone crusher head tends to perform a major part of the crushing work near the outmost rim that is at the bottom region of the crusher head. The main shaft has bearings that require lubrication and to isolation from the mineral material and other dirt. Therefore, there is a slip ring attached to a fixed bottom part of the cone crusher and the moving crusher head is shaped to contain an armpit like recess that receives the slip ring.

The inventors have analysed forces that are induced in the crushing process and their impact on wear appearing in the crusher head and main shaft. The armpit recess in part accents harmful forces which increase mutual sliding distance between the crusher head and the main shaft. That is, the crushing forces induce local forces at the interference fit region which sometimes exceed the forces produced by the thermal expansion (or contraction) so that mutual sliding may arise in the magnitude of tens of micro meters. This mutual sliding was studied by the inventors with respect of a number of factors including the geometry of the shaft and of the crusher head.

The inventors have now invented particular improvements in the crusher head and main shaft, which result in significant reduction of fretting wear of the crusher head and of the main shaft. It is an object of the present invention to reduce fretting wear of a cone crusher head interference fit. An alternative object of the present invention is to at least provide a new technical alternative.

SUMMARY

The appended claims define the scope of protection. Any examples and technical descriptions of apparatuses, products and/or methods in the description and/or drawings not covered by the claims are presented not as embodiments of the invention but as background art or examples useful for understanding the invention.

According to a first example aspect there is provided a crusher head of a cone crusher, comprising:

- a conical mantle radially extending from an interference fit section, comprising a wear part support surface and a shaft support surface;
- the shaft support surface comprising the interference fit section for supporting the crusher head to a main shaft;
- the interference fit section having a nominal interference fit diameter $D_{if}$;
- the conical mantle comprising an armpit groove for receiving a slip ring;
- the armpit groove being covered by conical mantle with an armpit thickness $L_a$ that is a minimum distance between a wear part support surface and the armpit;
- the conical mantle having a head diameter $D_{ch}$ that is a maximum diameter of the crusher head; wherein fretting wear is reduced by dimensioning of the crusher head for minimising deformations at the interference fit section by:
- a ratio of the head diameter $D_{ch}$ to the nominal interference fit diameter $D_{if}$ being at most 2.5; and
- a ratio of the head diameter $D_{ch}$ to the armpit thickness $L_a$ being at least 10.5.

It is recognised that the crusher head of a cone crusher typically has a given wear part support surface angle and overhang below a bottom level of the interference fit section. By increasing the ratio of the head diameter to the armpit thickness, the interference fit section may be proportionally expanded so that deformations as a whole can be reduced in the main shaft and the crusher head. In the crusher head of the first example aspect, such deformations may be reduced so that fretting wear is reduced in the interference fit section and the work life is extended for the main shaft and/or the crusher head.

The armpit groove may be defined by an inner radius from a central axis of the crusher head and by an outer radius from the central axis of the crusher head. The central axis may be defined by the interference fit section of the crusher head or a symmetry axis of the interference fit section.

The inner radius may be continuously decreasing or same from the top of the armpit groove onwards. The outer radius may be continuously increasing or same from the top of the armpit groove onwards. The armpit groove may be free of constrictions on both sides. In result of neither inner radius increasing nor outer radius decreasing, the armpit groove may be simple to manufacture and/or refurbish.

Terms inwards and outwards may refer to directions perpendicularly towards the central axis and perpendicularly away of the central axis.

The armpit groove may have a rounded top section. The rounded top section may be defined by a first portion of a first circle of a first radius, $R_1$, and by a second portion of a second circle of a second radius, $R_2$. The first circle may have a first centre and second circle may have a second centre.

The first centre and second centre may be vertically aligned. The second radius may be greater than the first radius. The second centre may reside below the first centre. The second centre may be perpendicularly aligned with the interference fit section.

The first circle may extend below the interference fit section. The second circle may extend below the interference fit section. If the rounded top section is defined by a single circle, the single circle may extend below the interference fit section. By forming a relatively shallow armpit groove, deformative forces may be controlled about the armpit groove and fretting wear may be further reduced. This net effect is surprising in that the interference fit section can be formed the longer the deeper the interference fit section extends below the top of the armpit groove and so a shallower armpit portion appears to be contradicting the objective of reducing fretting wear.

The first portion of the first circle may extend on an outer side of the armpit groove at most vertically to a level of the first centre. The first portion of the first circle may extend on an outer side of the armpit groove vertically to the level of the first centre.

The first portion of the first circle may extend over a sector that extends vertically upwards from the first centre and horizontally outwards from the first centre. The first portion of the first circle may define a sector that extends vertically upwards from the first centre and horizontally outwards from the first centre. The second portion may continue inwards from the first portion. The second portion may consist of a sector of less than 90 degrees. The second portion may consist of a sector of less than or equal to 80 degrees. The second portion may consist of a sector of more than or equal to 60 degrees.

The inner radius may continuously decrease towards the bottom of the interference fit section. A bottom of the inner side of the armpit groove may be aligned with the interference fit section.

The inner side of the armpit groove may approach bottom of the interference fit section with a deviation angle from the central axis. The deviation angle may be at most 40 degrees. The deviation angle may be at most 30 degrees. The deviation angle may be at most 20 degrees. The deviation angle may be at least 30 degrees. The deviation angle may be at least 20 degrees. The deviation angle may be at least 10 degrees.

The outer side of the armpit groove may meet an intermediate surface with an angle greater than 270 degrees.

The crusher head may be configured to be laterally supported by the main shaft only by the interference fit section.

In this document, vertical and other terms based on vertical directions, such an up, down, top, and bottom, refer to longitudinal directions of the main shaft such that the top is the direction from which mineral material is received and progresses towards bottom by gravity. In operation, the main shaft may incline from one side to another, but on average, when the cone crusher is horizontally supported, the main shaft and the central axis of the crusher head can be seen as vertically aligned.

According to a second example aspect there is provided a system comprising the crusher head of the first example aspect and the main shaft.

The main shaft may comprise an interference fit section for supporting a crusher head, the interference fit section having the nominal interference fit diameter $D_{if}$.

The main shaft may comprise a bottom shaft section extending between a bottom end of the main shaft and the interference fit section. The bottom shaft section may comprise a bottom part and a neck part.

The bottom part may have a bottom part length $L_{bp}$ and a bottom part diameter $D_{bp}$. The bottom part diameter $D_{bp}$ may be constant below the neck part on at least 50% of the bottom part length $L_{bp}$.

The neck part may have a neck part diameter that is growing towards the interference fit section.

The main shaft may have a main shaft length $L_{ms}$.

For further reducing fretting wear in the interference fit section, $L_{ms}^{1.3}/D_{if}$ may be at most 40 $mm^{0.3}$.

For further reducing fretting wear in the interference fit section, $D_{bp}^{1.421}/D_{if}$ may be at most 9.0 $mm^{0.421}$.

The main shaft length $L_{ms}$ may be at least 1200 mm.

Advantageously, the second example aspect has been found to increase the wear lifetime of the cone crusher head of a commercial cone crusher by reducing load induced deformation of the main shaft in the interference fit section. This advantage has been realised despite an opposite effect caused by respective reduction in crusher head material thickness at the interference fit section as an increased shaft opening is needed into the crusher head.

Further advantageously, it has been found that the second example aspect enables both reducing sliding and contact dissipation energy as well as reducing stresses and stress variation induced to the cone crusher head when attached to the main shaft of the second example aspect.

Further still, it has been found that the inertia of a combination of the main shaft and the crusher head do not increase in proportion with the increased diameter, as the increased inertia on the main shaft side is compensated by reduced inertia on the crusher head side.

Still further advantageously, it has been identified that the increased diameter in the interference fit section also increases loaded surface area in the interference fit section, which further contributes to the reduction of the fretting wear, while the reduced deformation in the interference fit section is believed to mostly contribute in achieved significant work life increase.

The interference fit section may have an interference fit section length B over which the interference fit section is configured to be interference fitted with the crusher head. $D_{bp}^{1.421}/D_{if}$ may be at most 8.0 $mm^{0.421}$. $D_{bp}^{1.421}/D_{if}$ may be at most 7.7 $mm^{0.421}$. The main shaft may comprise only one interference fit section for attaching the crusher head. The interference fit section may be longitudinally continuous.

$D_{bp}^{1.421}/D_{if}$ may be at least 6.4 $mm^{0.421}$. $D_{bp}^{1.421}/D_{if}$ may be at least 6.9 $mm^{0.421}$.

The main shaft may comprise a top part from the interference fit section to a top of the main shaft.

The neck part diameter may be growing towards the interference fit section to the interference fit section diameter.

The nominal interference fit section diameter may be suited for interference fitting to a diameter of a crusher head having an interference fit of the nominal interference fit diameter.

The main shaft may be configured to laterally support the crusher head only by the interference fit section. Advantageously, by solely supporting the crusher head laterally by the interference fit section, there is no need to allow some of the height of the main shaft to be used for additional lateral supporting the crusher head. In return, the interference fit section may be made longer in the longitudinal direction and thus the fretting wear can be still further reduced. Further advantageously, machining of the crusher head is made simpler by removing a need to machine opening sections of different radiuses for the longitudinal support. Interference fit section may have a longitudinal length of at least 50% of the longitudinal length or height of the cone crusher head.

According to a third example aspect there is provided a system comprising a main shaft of the second example aspect and a cone crusher head configured for interference fit attaching to the main shaft interference fit section.

The cone crusher head may be attached to the main shaft.

According to a fourth example aspect there is provided a cone crusher comprising the system of the second example aspect.

Different non-binding example aspects and embodiments have been illustrated in the foregoing. The embodiments in the foregoing are used merely to explain selected aspects or steps that may be utilized in different implementations. Some embodiments may be presented only with reference to certain example aspects. It should be appreciated that corresponding embodiments may apply to other example aspects as well.

BRIEF DESCRIPTION OF THE FIGURES

Some example embodiments will be described with reference to the accompanying Figures, in which.

DETAILED DESCRIPTION

In the following description, like reference signs denote like elements or steps.

Figure 1:
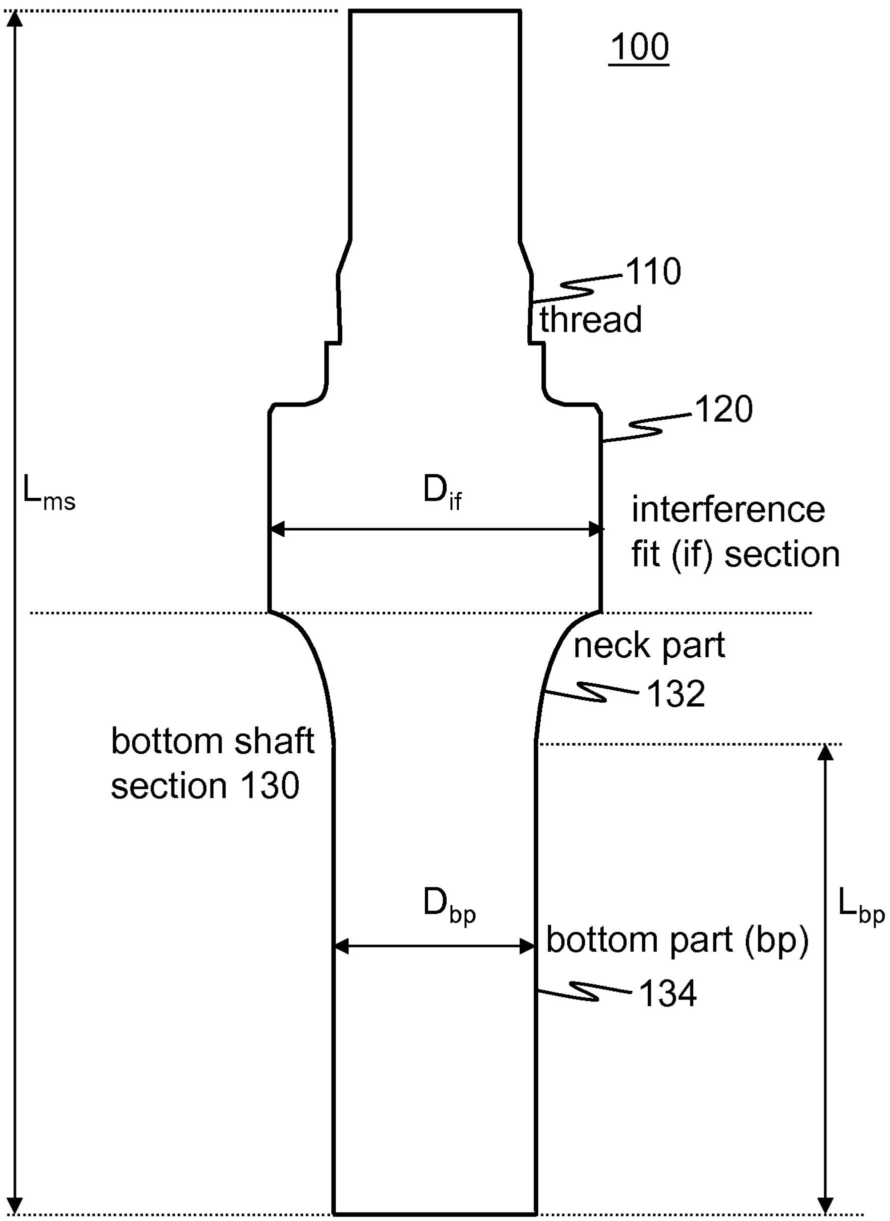
FIG. 1 schematically shows a main shaft of an example embodiment.

FIG. 1 schematically shows a main shaft 100 of an example embodiment. FIG. 1 shows some portions and dimensions of the main shaft (ms), such as a thread 110 for attaching a wear part (not shown) by a nut (not shown); an interference fit section 120; a bottom shaft section 130 that comprises a bottom part 134 and a neck part 132 between the bottom part 134 and the interference fit section (120).

FIG. 1 shows some dimensions such L stands for length, D stands for diameter, and a subscript indicates the object in question.

In FIG. 1, the bottom part has a constant diameter over its entire length, notwithstanding some possible rounding at the very bottom end. In some other embodiments, the bottom part may have some portions of greater or smaller diameter, but the diameter of the bottom part is present on at least 50% of the length of the bottom part. It is also possible that this at least 50% is formed of two or more portions.

The interference fit section has a nominal diameter $D_{if}$ that is configured to fit for cone crusher heads of a shaft opening having the nominal diameter $D_{if}$. In an embodiment, one or both ends of the interference fit section have slightly greater nominal diameter, e.g., in the range of tens or hundreds of parts per million in comparison to the nominal diameter $D_{if}$.

As in FIG. 1, the main shaft comprises in an example embodiment only one interference fit section for attaching the crusher head. Preferably, the interference fit section is longitudinally continuous.

As shown in FIG. 1, the neck part has a neck part diameter that is growing towards the interference fit section. In FIG. 1 embodiment, the neck part grows to the nominal diameter, or in other words, the surface of the main shaft deviates from a perpendicular plane formed with relation to an axial direction of the main shaft, all the way from the centre of the interference fit section 120 over the neck part.

Figure 2:
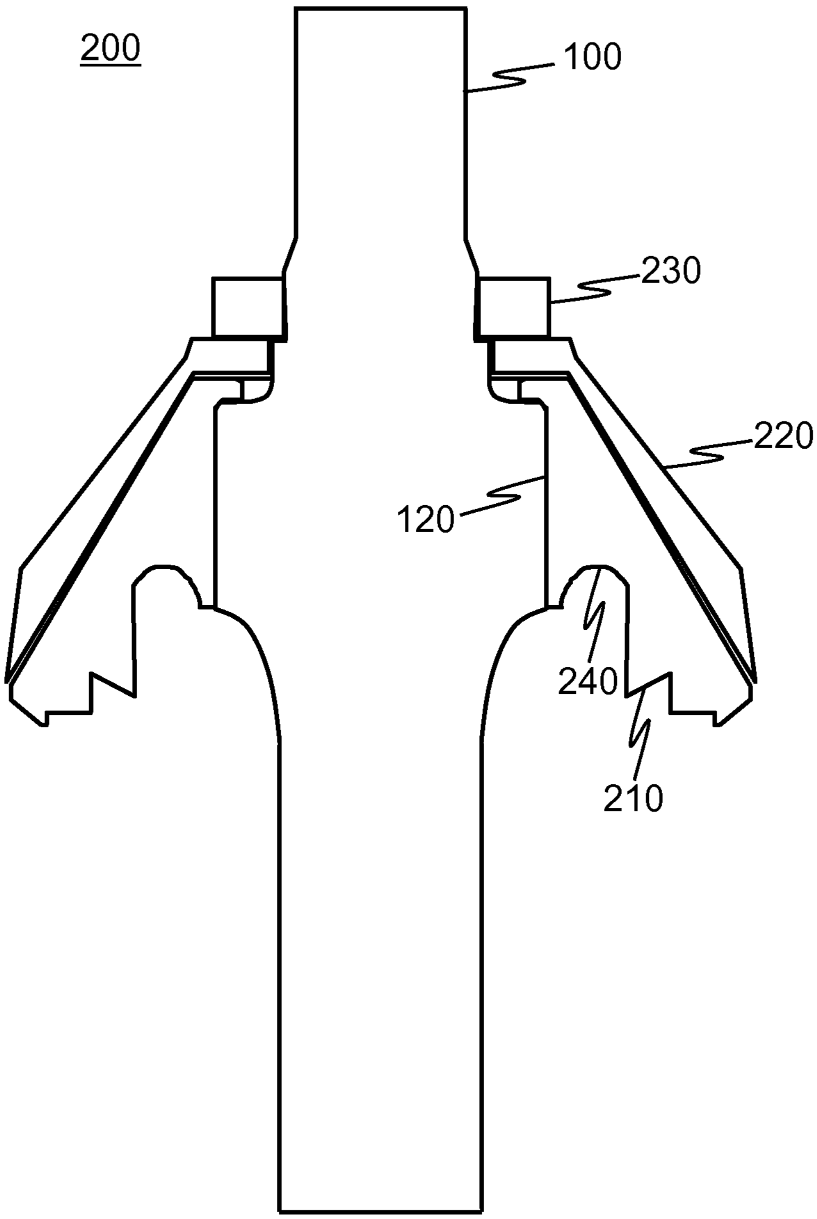
FIG. 2 schematically shows a system of main shaft and a cone crusher head of an example embodiment.

As also shown in FIGS. 1 and 2, the main shaft 100 can be configured to laterally support or at least to laterally engage with the crusher head only by the interference fit section.

In the main shaft 100 of FIG. 1, fretting wear is reduced in the interference fit section by forming the interference section and the bottom part such that $L_{ms}^{1.3}/D_{if}$ is at most 40 $mm^{0.3}$; while the interference fit section 120 and the bottom part are such that $D_{bp}^{1.421}/D_{if}$ is at most 9.0 $mm^{0.421}$.

It is appreciated that the main shaft 100 and a cone crusher head will form a system. The greater the diameter is at the interference fit section, the wider an opening is required in the crusher head and thus the thinner the structures will be there. It would appear intuitive to assume that since the shaft is squeezed on all sides by the interference fit attached crusher head, the system will become more prone to deformations when the diameter is increased. Surprisingly, though, it was found that in two different commercially available cone crushers, the sliding distance under different loads and fretting wear were reduced in the range of tens percent or even more. While the entire force system is not fully understood, it is believed that the fretting wear can be reduced while $L_{ms}^{1.3}/D_{if}$ is at least 32.0 $mm^{0.3}$ or at least 32.5 $mm^{0.3}$.

The second condition, $D_{bp}^{1.421}/D_{if}$, is expected to operate through dynamics over the bottom part of the main shaft that extend over the interference fit section 120. In an example embodiment, this ratio is at least 6.4 $mm^{0.421}$ or at least 6.9 $mm^{0.421}$.

FIG. 2 shows a system 200 of the main shaft 100 and a cone crusher head 210 of an example embodiment. FIG. 2 also shows an inner wear part 220 attached to the cone crusher head 210 by a nut 230. The cone crusher head 210 has a round arm pit groove 240 for receiving a slip ring 320 shown in FIG. 3.

Figure 4:
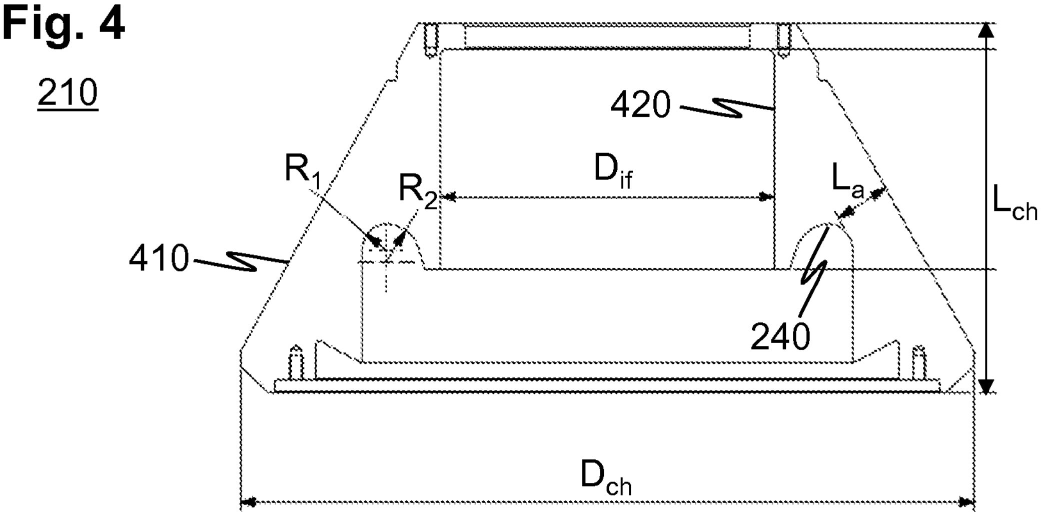
FIG. 4 schematically shows some further details of the cone crusher head of FIG. 2.

FIG. 4 illustrates some further details of the cone crusher head 210 of an example embodiment. In particular, FIG. 4 illustrates the dimensions $D_{if}$ nominal interference fit diameter;

$D_{ch}$ head diameter that is a maximum diameter of the crusher head 210;

$L_a$ armpit thickness that is a minimum distance between a wear part support surface and the armpit;

$L_{ch}$ length or height of the crusher head;

$R_1$ first radius according to which a first or outer portion of the top of the armpit groove is rounded; and $R_2$ second radius according to which a second or inner portion of the top of the armpit groove is rounded.

In an example embodiment, the cone crusher head 210 comprises the conical mantle 410 radially extending from an interference fit section 420 of the crusher head. The mantle 410 has a wear part support surface or an outer surface and a shaft support surface configured to engage with the interference fit section 120 of the main shaft 100.

The interference fit section has a nominal interference fit diameter $D_{if}$. It shall be appreciated that the nominal diameter of the main shaft 100 and of the corresponding crusher head 210 means slightly differing actual non-stressed diameters in room temperature. Without stress, the main shaft 100 would interference fit section 120 would not quite fit into the interference fit section 420 of the crusher head. Instead, when assembled with suitably heating the cone crusher head and/or cooling the main shaft 100, the assembly will have the interference fit with matching effective diameters on both main shaft and the crusher head 210.

The armpit groove 240 is covered by the conical mantle 410 with the armpit thickness $L_a$.

Fretting wear is reduced by dimensioning the crusher head for minimising deformations at the interference fit section so that a ratio of the head diameter $D_{ch}$ to the nominal interference fit diameter $D_{if}$ is at most 2.5; and a ratio of the head diameter $D_{ch}$ to the armpit thickness $L_a$ is least 10.5.

In an example embodiment, as shown in FIG. 4, the inner radius is continuously decreasing or same from the top of the armpit groove onwards.

In an example embodiment, as shown in FIG. 4, the outer radius is continuously increasing or same from the top of the armpit groove onwards.

As mentioned, the armpit groove has a rounded top section, which can be defined by a first portion of a first circle of a first radius, $R_1$, and by a second portion of a second circle of a second radius, $R_2$. Advantageously, though not necessarily, the first circle and the second circle have a first centre and second circle that are vertically aligned. In an example embodiment, the second radius is greater than the first radius and/or the second centre resides below the first centre. In an example embodiment, the second centre is perpendicularly aligned with the interference fit section.

In an example embodiment, the first circle extends below the interference fit section. In an example embodiment, the second circle may extend below the interference fit section. Moreover, in an example embodiment where the rounded top section is defined by a single circle, the single circle may extend below the interference fit section.

Figure 3:
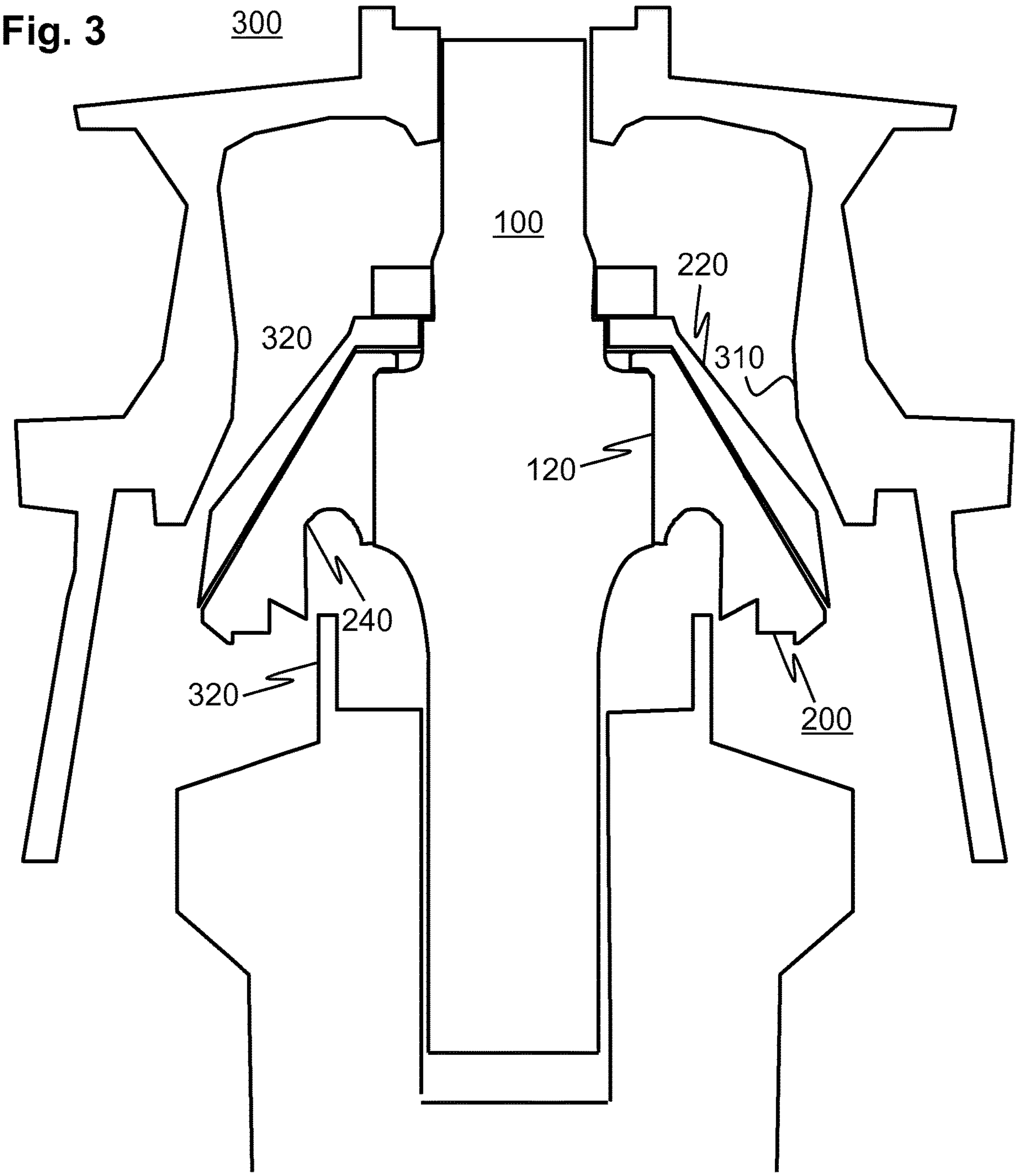
FIG. 3 schematically shows a cone crusher comprising the system of FIG. 2.

In an example embodiment shown in FIGS. 2 and 3, the first portion of the first circle extends on an outer side of the armpit groove vertically to a level of the first centre. The first portion of the first circle may extend on an outer side of the armpit groove vertically to the level of the first centre.

In an example embodiment, the first portion of the first circle extends over a sector that extends vertically upwards from the first centre and horizontally outwards from the first centre. The In an example embodiment, the portion of the first circle defines a sector that extends vertically upwards from the first centre and horizontally outwards from the first centre. In an example embodiment, the second portion continues inwards from the first portion. In an example embodiment, the second portion consists of a sector of less than 90 degrees, such as less than or equal to 80 degrees and/or at least 60 degrees.

In an example embodiment, the inner radius continuously decreases towards the bottom of the interference fit section. In an example embodiment, a bottom of the inner side of the armpit groove is aligned with the interference fit section.

In an example embodiment, the inner side of the armpit groove approach bottom of the interference fit section with a deviation angle from the central axis, such as at most 40; 30; or 20 degrees; and or at least 30; 20; or 10 degrees.

In an example embodiment, the outer side of the armpit groove meets an intermediate surface with an angle greater than 270 degrees.

FIG. 3 schematically shows a cone crusher 300 comprising the system of FIG. 2, comprising the main shaft 100, the cone crusher head 200, an outer wear part 210 and a crushing chamber 320 between the inner and outer wear parts 210, 310.

Various embodiments have been presented. It should be appreciated that in this document, words comprise; include; and contain are each used as open-ended expressions with no intended exclusivity.

The foregoing description has provided by way of non-limiting examples of particular implementations and embodiments a full and informative description of the best mode presently contemplated by the inventors for carrying out the invention. It is however clear to a person skilled in the art that the invention is not restricted to details of the embodiments presented in the foregoing, but that it can be implemented in other embodiments using equivalent means or in different combinations of embodiments without deviating from the characteristics of the invention.

Furthermore, some of the features of the afore-disclosed example embodiments may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. A crusher head of a cone crusher, comprising:

a conical mantle radially extending from an interference fit section, comprising a wear part support surface and a shaft support surface;

the shaft support surface comprising the interference fit section for supporting the crusher head to a main shaft;

the interference fit section having a nominal interference fit diameter Dif;

the conical mantle comprising an armpit groove for receiving a slip ring;

the armpit groove being covered by the conical mantle with an armpit thickness La that is a minimum distance between a wear part support surface and the armpit; and the conical mantle having a head diameter $D_{ch}$ that is a maximum diameter of the crusher head; wherein fretting wear is reduced by dimensioning of the crusher head for minimising deformations at the interference fit section by:

a ratio of the head diameter $D_{ch}$ to the nominal interference fit diameter $D_{if}$ being at most 2.5; and a ratio of the head diameter $D_{ch}$ to the armpit thickness $L_a$ being at least 10.5.

2. The crusher head of claim 1, wherein the armpit groove is shaped so that both sides are free of constrictions.

3. The crusher head of claim 1, wherein the armpit groove has a rounded top section defined by a first portion of a first circle of a first radius, $R_1$, and by a second portion of a second circle of a second radius, $R_2$, wherein the second circle is vertically aligned with the first circle and $R_2>R_1$.

4. The crusher head of claim 2, wherein the armpit groove has a rounded top section defined by a first portion of a first circle of a first radius, $R_1$, and by a second portion of a second circle of a second radius, $R_2$, wherein the second circle is vertically aligned with the first circle and $R_2>R_1$.

5. The crusher head of claim 3, wherein the first circle extends below the interference fit section.

6. The crusher head of claim 4, wherein the first circle extends below the interference fit section.

7. The crusher head of claim 1, wherein interference fit section has a longitudinal length of at least 50% of the longitudinal length Lch of the cone crusher head.

8. The crusher head of claim 1, wherein the first portion of the first circle extends on an outer side of the armpit groove at most vertically to a level of the first centre.

9. The crusher head of claim 1, wherein a bottom of the inner side of the armpit groove is aligned with the interference fit section.

10. The crusher head of claim 1, wherein an inner side of the armpit groove approaches a bottom of the interference fit section with a deviation angle from the central axis; and the deviation angle is at most 30 degrees.

11. The crusher head of claim 1, wherein an outer side of the armpit groove meets an intermediate surface with an angle greater than 270 degrees.

12. The crusher head of claim 1, wherein the crusher head is configured to be laterally supported by the main shaft only by the interference fit section.

13. A system comprising the crusher head of claim 1 and the main shaft of a cone crusher, the main shaft comprising an interference fit section for supporting a crusher head, the interference fit section having a nominal interference fit diameter $D_{if}$;

a bottom shaft section extending between a bottom end of the main shaft and the interference fit section;

the bottom shaft section comprising a bottom part and a neck part;

wherein the bottom part has a bottom part length $L_{bp}$ and a bottom part diameter $D_{bp}$ that is constant below the neck part on at least 50% of the bottom part length $L_{bp}$;

the neck part has a neck part diameter that is growing towards the interference fit section; and the main shaft has a main shaft length $L_{ms}$;

wherein for reducing fretting wear in the interference fit section, $L_{ms}^{1.3}/D_{if}$ is at most 40 $mm^{0.3}$; and $D_{bp}^{1.421}/D_{if}$ is at most 9.0 $mm^{0.421}$.

14. The system of claim 13, wherein the main shaft length $L_{ms}$ is at least 1200 mm.

15. The system of claim 13, wherein $D_{bp}^{1.421}/D_{if}$ is at most 8.0 $mm^{0.421}$.

16. The system of claim 14, wherein $D_{bp}^{1.421}/D_{if}$ is at most 8.0 $mm^{0.421}$.

17. The system of claim 13, wherein the main shaft is configured to laterally support the crusher head only by the interference fit section of the main shaft.

18. The system of claim 14, wherein the main shaft is configured to laterally support the crusher head only by the interference fit section of the main shaft.

19. The system of claim 15, wherein the main shaft is configured to laterally support the crusher head only by the interference fit section of the main shaft.

20. A cone crusher comprising the system of claim 13.

* * * * *